Jan. 6, 1948.  D. B. SUGGS  2,434,085
OIL TEMPERATURE CONTROLLING APPARATUS FOR PUSHER TYPE AIRPLANES
Filed April 13, 1945  4 Sheets-Sheet 1

Inventor
Dalton B. Suggs
By Fred Gerlach
Atty.

Jan. 6, 1948.  D. B. SUGGS  2,434,085
OIL TEMPERATURE CONTROLLING APPARATUS FOR PUSHER TYPE AIRPLANES
Filed April 13, 1945  4 Sheets-Sheet 3

Inventor
Dalton B. Suggs
By Fred Gerlach atty.

Jan. 6, 1948.  D. B. SUGGS  2,434,085
OIL TEMPERATURE CONTROLLING APPARATUS FOR PUSHER TYPE AIRPLANES
Filed April 13, 1945   4 Sheets-Sheet 4

Inventor
Dalton B. Suggs
By Fred Gerlach
Atty

Patented Jan. 6, 1948

2,434,085

UNITED STATES PATENT OFFICE 2,434,085

OIL TEMPERATURE CONTROLLING APPARATUS FOR PUSHER TYPE AIRPLANES

Dalton B. Suggs, Fort Worth, Tex., assignor to Consolidated Vultee Aircraft Corporation, San Diego, Calif., a corporation of Delaware Application April 13, 1945, Serial No. 588,182

11 Claims. (Cl. 244—57)

The present invention relates generally to apparatus for regulating or controlling the temperature of the lubricating oil for internal combustion engines. More particularly the invention relates to that type of oil temperature controlling apparatus which is designed primary for use in connection with an airplane engine and as certain of its parts comprises (1) a duct which is disposed within, and extends generally lengthwise of, the engine nacelle and has the front end thereof open and leading through the front portion of the nacelle in order to permit outside air to enter and flow through the duct; and (2) a radiator variety oil cooler which is disposed within, and extends across, the duct, is so connected that the engine lubricating oil is caused to flow or circulate through it during operation of the engine, and serves to effect cooling of the oil in response to the flow of outside air through the duct.

Heretofore one of the major difficulties in the designing of a pusher type airplane has been the proper control of the temperature of the lubricating oil for the engine, particularly when the airplane is operated on the ground directly before or after flight. When an airplane is in the air, i. e., in flight, its forward movement results in the flow of sufficient air through the duct and past the cooler to effect proper cooling of the engine lubricating oil but when the airplane is on the ground its forward movement is so reduced that the flow of air through the cooler duct is insufficient properly to cool the oil as it circulates through the cooler. In a tractor type airplane the problem of cooling the lubricating oil for the engine is of no moment or consequence in view of the fact that the engine driven propeller is disposed forwards of the front or inlet end of the cooler duct and a portion of the air stream that is created by the propeller is directed into the duct for flow past the cooler. However, in a pusher type airplane wherein the propeller is aft or rearwards of the engine there is no direct air flow from the propeller through the duct and past the cooler, especially when the airplane is on the ground and the air current that is created forwards of the propeller is insufficient to provide the necessary flow of air through the duct for cooling of the lubricating oil in circulation through the cooler.

The primary object of the invention is to provide an oil temperature controlling apparatus of the aforementioned type which is designed and adapted primarily for use in connection with a pusher type airplane and serves efficaciously to cool or regulate the temperature of the engine lubricating oil while the airplane is operated on the ground as well as when it is in flight.

Another object of the invention is to provide an apparatus of the last mentioned character in which the duct within which is mounted the radiator type oil cooler has the rear end thereof shaped to form a pair of branches, one of which leads through the engine nacelle in order to exhaust into outside air and has a valve for controlling the flow of air therethrough, and the other of which leads to, and discharges into, the fan created air stream for cooling the engine and has a valve for controlling the flow of air through it.

Another object of the invention is to provide an oil temperature controlling apparatus of the last mentioned character which comprises control means whereby the valve for the branch of the duct that leads to, and communicates with, the fan created air stream for cooling the engine is automatically closed when the airplane is in flight and the valve for the other branch of the duct, i. e., the branch that leads through the engine nacelle to outside air is automatically closed when the airplane is at rest on the ground or is travelling at a low velocity on the ground either directly before or after flight.

A further object of the invention is to provide an apparatus of the aforementioned type and character in which the valves for controlling the flow of air through the two branches at the rear or discharge end of the duct are shifted into and out of their closed position by electric actuators constituting a part of the automatic control means and such means includes in addition to the actuators a novel electric system for controlling actuation of the actuators.

A still further object of the invention is to provide an oil temperature controlling apparatus which is generally of new and improved construction, effectively and efficiently fulfills its intended purpose and is characterized by simplicity of design, cheapness of construction, and automatic operation.

Other objects of the invention and the various advantages and characteristics of the present oil temperature controlling apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views.

Figure 1:
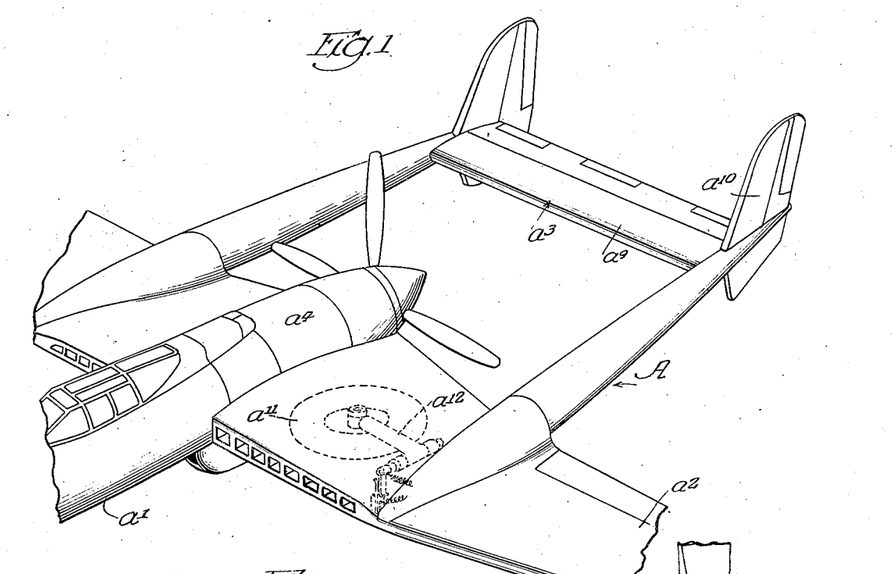
Figure 1 is a fragmentary perspective of a pusher type airplane having applied thereto an oil temperature controlling apparatus embodying the invention.
Figure 2:
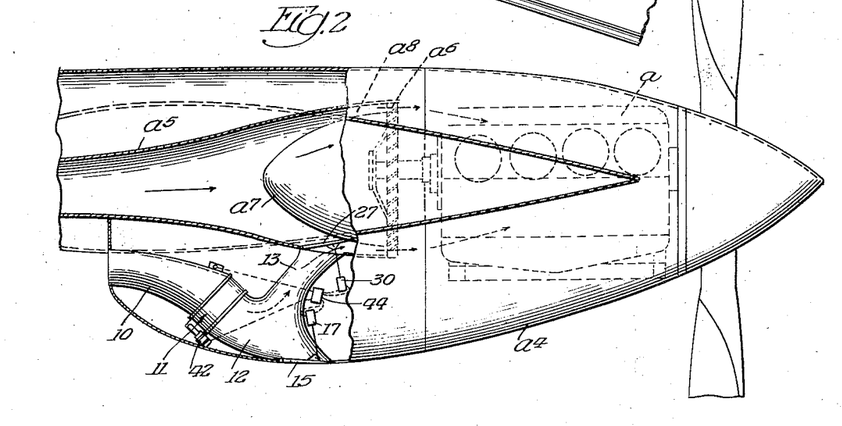
Figure 2 is a side view of the nacelle for the propeller driving engine of the airplane, certain parts being broken away in order to show or illustrate the arrangement, design and location of the duct and oil cooler of the oil temperature controlling apparatus.
Figure 3:
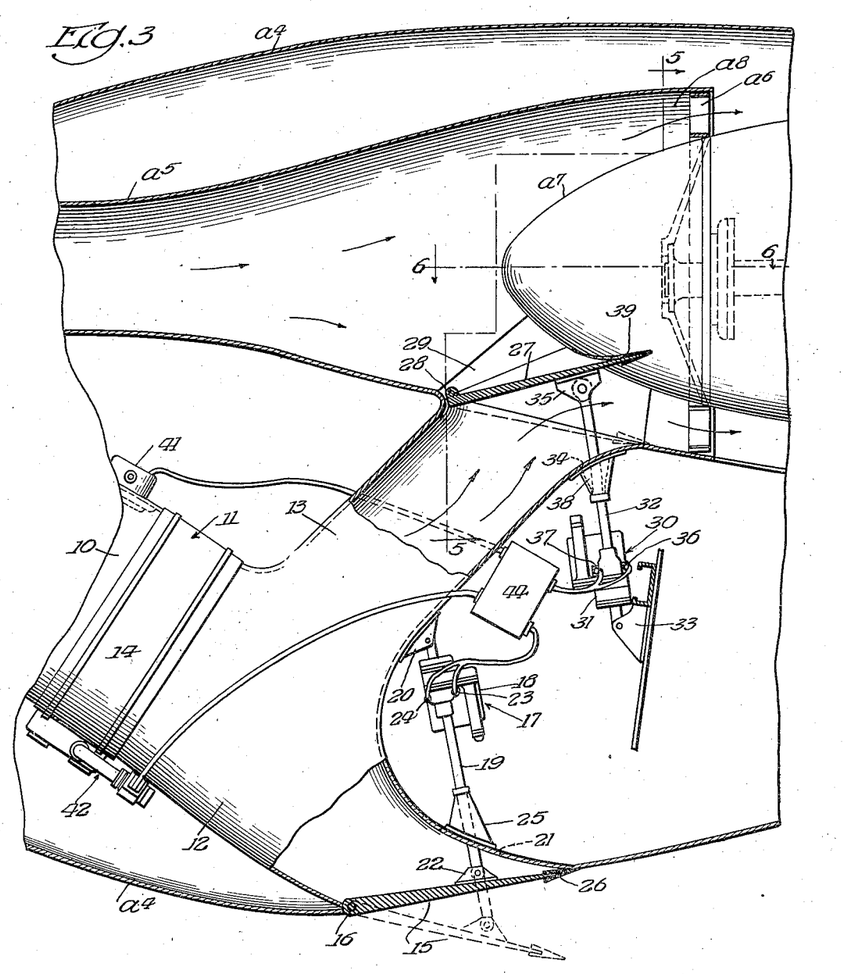
Figure 3 is a vertical longitudinal section of the front portion of the nacelle, illustrating in detail the construction and arrangement of the mechanical parts of the oil temperature controlling apparatus and showing the manner in which the valves for controlling the two branches at the rear end of the duct are mounted to swing into and out of their closed positions.

The oil temperature controlling apparatus which is shown in the drawings constitutes the preferred form or embodiment of the invention. It is illustrated in connection with a pusher type airplane A having a propeller driving internal combustion engine $a$ therefor and serves as hereinafter described to control or regulate the temperature of the lubricating oil for the engine regardless of whether the airplane is in flight or on the ground. The airplane A with which the apparatus is associated comprises in addition to the propeller driving engine $a$ a fuselage $a^1$, a wing $a^2$, and an empennage $a^3$. The fuselage is provided with a pilot's compartment in the front portion thereof and has at its rear end a nacelle $a^4$ for housing the engine $a$. The nacelle has the front lower portion thereof disposed beneath the adjacent portion of the fuselage in order that in connection with flight of the airplane A the air stream impinges thereagainst. The engine $a$ is located in the rear portion or end of the nacelle and has the rear end of its crank shaft connected to the pusher type propeller for the airplane. Cooling of the engine is effected by way of a duct $a^5$ and a fan $a^6$. The duct $a^5$ is located in, and extends lengthwise of, the front portion of the nacelle $a^4$ and has the front end thereof open and arranged to receive outside air. The rear end of the duct $a^5$ is rearwardly flared, terminates adjacent the front end of the engine $a$ and surrounds a cone shaped deflector $a^7$. The latter is positioned concentrically within the rear end of the air duct $a^5$ and has the apex or small end thereof extending forwards. It is suitably supported and defines with the rear end of the duct $a^5$ an annular exhaust or discharge passage $a^8$. The fan $a^6$ is mounted on the front end of, and driven by, the crank shaft of the engine $a$ and has blades which traverse the exhaust passage $a^8$ at the rear end of the air duct $a^5$. The fan blades are so arranged that when the engine is in operation outside air is drawn through the duct $a^5$ and forced rearwards under pressure around the engine for cooling purposes. The wing $a^2$ constitutes the main supporting surface for the airplane A and comprises a pair of outboard sections which are connected to, and project outwards from, the rear portion of the fuselage $a^1$. The empennage $a^3$ is of conventional design or construction and embodies an elevator equipped horizontal stabilizer $a^9$ and a pair of rudder equipped vertical stabilizers $a^{10}$ at the ends of the horizontal stabilizer. The airplane A is supported on the ground by way of a retractable tricycle landing gear comprising a pair of main ground wheels $a^{11}$ which underlie the inner portions of the outboard sections of the wing $a^2$ and are supported by struts $a^{12}$ which are pivoted, as well understood in the art, so that the wheels $a^{11}$ may be swung back and forth between their operating position wherein they are adapted to engage the ground and a retracted position wherein they are disposed within wells in the under portions of the outboard sections of the wing.

The oil temperature controlling apparatus is located for the most part within the engine nacelle $a^4$ and comprises an air duct 10 and an oil cooler 11.

The duct 10 is located within, and extends lengthwise of, the front lower portion of the engine nacelle $a^4$ and has the front end thereof open and leading through the front portion of the nacelle in order to permit outside air to enter and flow through the duct in connection with forward propulsion of the airplane A. The rear end of the duct 10 is shaped to form a pair of discharge branches 12 and 13. The branch 12 extends downwards and rearwards and leads through the central portion of the bottom of the engine nacelle $a^4$ in order that it exhausts into outside air. The other branch of the duct 10, i. e., the branch 13, extends upwards and rearwards and communicates with the bottom of the annular exhaust passage $a^8$ at the rear end of the air duct $a^5$ by way of a hole or opening in the bottom portion of the rear end of the duct $a^5$.

Figures 4, 5, 6:
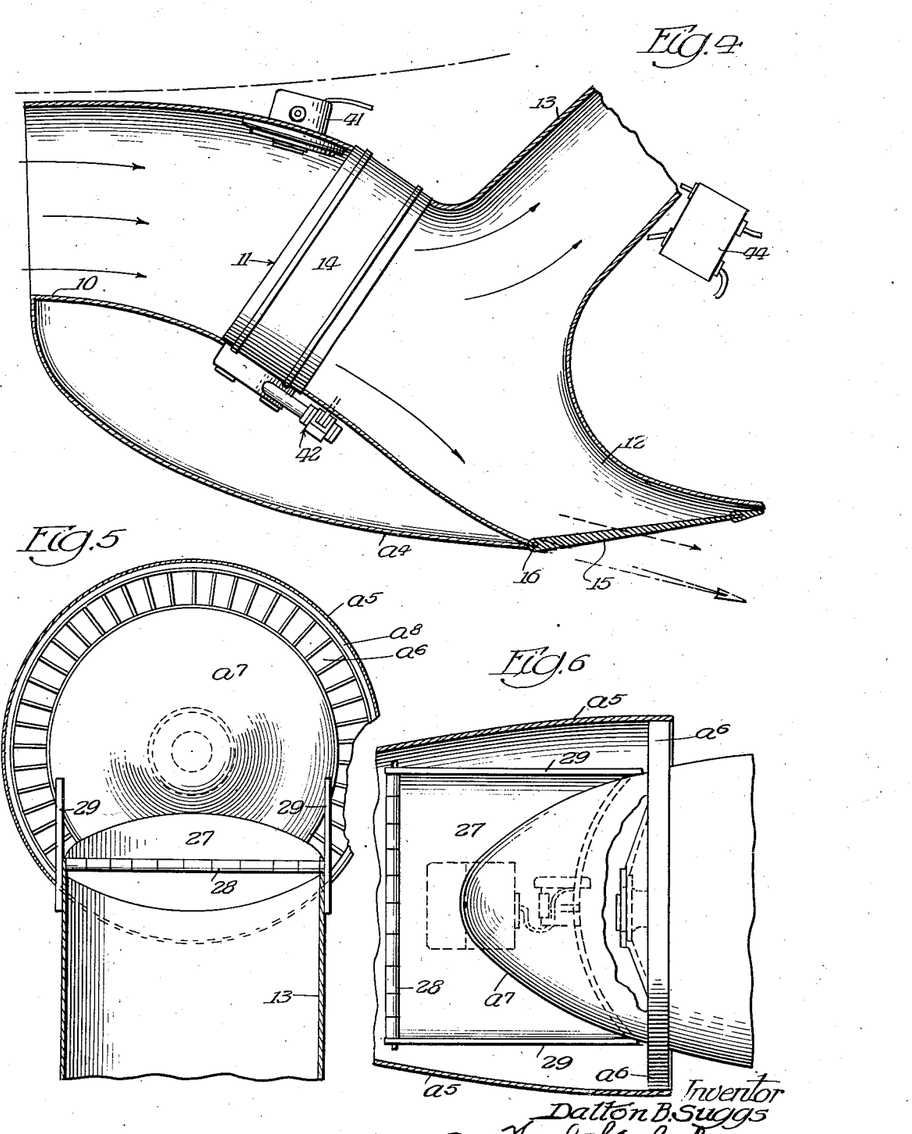
Figure 4 is a vertical longitudinal section of the front portion of the duct of the controlling apparatus illustrating the manner in which the radiator type oil cooler is mounted therein.
Figure 5 is a vertical transverse section on the line 5—5 of Figure 3.
Figure 6 is a horizontal section on the line 6—6 of Figure 3.

The cooler 11 is of the conventional radiator variety, and is disposed within, and extends transversely across, the central portion of the duct 10. It is so connected that the lubricating oil for the engine $a$ is caused to flow or circulate through it during operation of the engine. In general the cooler 11 comprises an annular shell 14 and a core (not shown) within the shell. The core is in the form of a plurality of serially connected tubes which extend lengthwise of the shell. The air in transit through the duct 10 operates as it flows past the tubes constituting the core of the cooler, to absorb heat and thus reduces the temperature of the engine lubricating oil as it flows through the cooler.

The flow of air through the downwardly and rearwardly extending branch 12 of the duct 10 is controlled by a plate type valve 15 which is shaped conformably to the discharge end of the branch 12 and has a hinge 16 at its front portion whereby it may be swung back and forth between a closed position wherein it extends across and serves to close the discharge end of the branch 12 and an open position (see dotted lines in Figure 3) wherein it extends downwards and uncovers the discharge end of the branch 12. The valve 15 is swung back and forth between its closed and open positions by way of an electrically operated actuator 17. The latter is of conventional design. It is disposed rearwards of the branch 12 of the duct 10 and comprises a body 18 and an actuating arm 19. The body 18 is pivotally connected to a bracket 20 on the rear portion of the branch 12 in order that the actuator is permitted to swing in a vertical plane. The actuating arm 19 extends downwards from the body 18 and has its upper end slidably mounted within the body. The central portion of the arm 19 extends through a hole 21 in the rear portion of the branch 12 and the lower end of the arm is pivotally connected to a bracket 22 on the distal or rear portion of the plate valve 15. The acutator body 18 is provided with a pair of binding posts 23 and 24 as shown in Figure 3. The actuator 17 is so designed and constructed that when electric current is supplied to the binding post 23 the actuating arm 19 is caused to slide upwards and thus swing the plate valve 15 into its closed position, and when electric current is supplied to the binding post 24 the actuating arm 19 is caused to slide or shift downwards and effect opening of the valve 15. A flexible dust guard 25 is applied to the central portion of the arm 19 and serves to prevent the flow of air through the hole 21 while at the same time permitting the arm to swing laterally in connection with shift of the valve 15 back and forth between its closed and open positions. The marginal portion of the valve 15 is provided with a resilient pad 26 which assures complete sealing of the discharge end of the branch 12 when the valve 15 is in its closed position.

Flow of air through the branch 13 of the duct 10 is controlled by means of a plate type valve 27 which when in its closed position extends across and seals the exhaust end of said branch. The valve 27 is provided at the front margin thereof with a hinge 28 whereby it may be swung back and forth between its closed position and an open position wherein it extends upwards as shown in dotted lines in Figure 3. The rear or distal margin of the valve 27 is concave or dished in order to fit snugly against the superjacent portion of the conical deflector $a^7$ when the valve 27 is in its open position. A pair of laterally spaced upstanding plates 29 are located adjacent the side margins of the valve 27. The lower margins of these plates are welded or otherwise fixedly secured to the bottom portion of the rear end of the air duct $a^5$ and the upper margins of the plates are shaped conformably to, and are welded or otherwise fixedly secured to the bottom portion of, the deflector $a^7$. The side margins of the valve 27 are straight and are adapted slidably to engage the inner faces of the plates 29 in connection with shift of the valve 27 into and out of its closed position. When the valve 27 is in its open position while the valve 15 is closed the fan $a^6$ during drive by the engine $a$ of the airplane operates to draw outside air so that it flows into the duct 10, then past the oil cooler 11, and thence through the branch 13 and into the annular exhaust passageway $a^8$ between the conical deflector $a^7$ and the rear end of the duct $a^5$. It is contemplated that the valve 27 will be in its open position and the valve 15 will be in its closed position when the airplane A is on the ground. By employing the valve controlled branch 13 efficient cooling of the engine lubricating oil is effected by the cooler 11 while the airplane is on the ground and any forward speed thereof is insufficient to cause air in sufficient amount to flow past the cooler for oil cooling purposes. The valve 27 is swung back and forth between its closed and open positions by way of an electrically operated actuator 30. This actuator is located for the most part beyond the branch 13 and is like the actuator 17 except that it is reversely positioned. It is automatically controlled as hereinafter described and comprises a body 31 and an upstanding actuating arm 32. The body 31 is pivotally connected to a bracket 33 on one of the structural members of the engine nacelle $a^4$ in order that the actuator 30 as a whole is free to swing in a vertical plane. The lower end of the actuating arm 32 is slidably mounted in the body 31 and the central portion of the arm extends through a hole 34 in the rear portion of the duct branch 13. The upper end of the arm 32 is pivotally connected to a bracket 35 on the rear or distal portion of the plate valve 27. When the arm 32 is slid upwards the valve 27 is shifted into its open position and when the arm is slid downwards the valve is swung or shifted into its closed position wherein it seals the discharge end of the branch 13. The body 31 of the electrically operated actuator 30 is provided with a pair of binding posts 36 and 37. The actuator 30 is so designed and constructed that when current is supplied to the binding post 36 the actuating arm 32 is slid upwards and effects opening of the valve 27 and when electric current is supplied to the binding post 37 the actuating arm 32 is slid downwards and effects retraction of the valve 27 into its closed position. The central portion of the actuating arm 32 is provided with a flexible dust guard 38 and this serves to close the hole 34 while at the same time it permits the arm 32 to swing laterally in connection with swinging of the plate valve 27 into and out of its closed position. The rear or distal marginal portions of the plate valve 27 are provided with a resilient pad 39 in order to assure complete sealing of the discharge end of the duct branch 13 when the valve is in its closed position. It is contemplated that the valve 27 will be maintained in its closed position and the valve 15 will be in its open position when the airplane is in flight. When the valve 27 is closed and the valve 15 is open during flight of the airplane A outside air enters the duct 1 via the latter's front end, then flows past the oil cooler 11 and effects cooling of the oil in circulation through the cooler by absorbing heat from it, and thence is discharged outside the engine nacelle $a^4$ via the branch 12.

Figure 7:
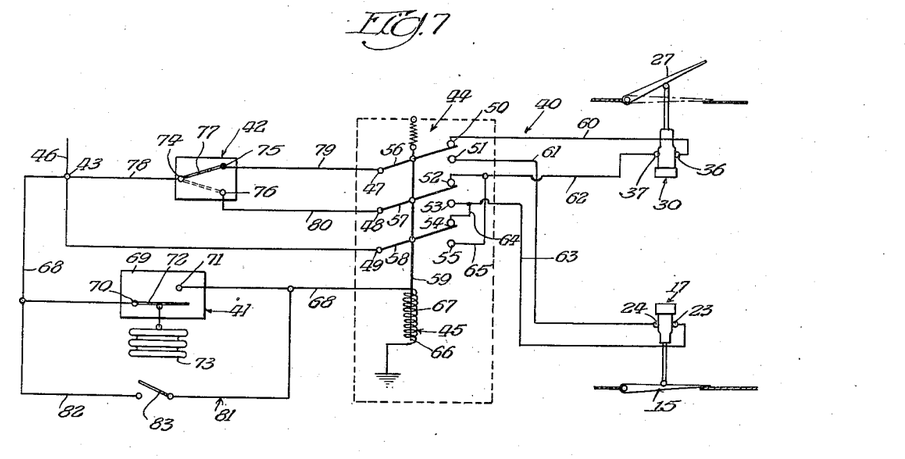
Figure 7 is a diagram showing one operating position of the electrical circuit system of the automatic means for controlling or actuating the valves.
Figure 8:
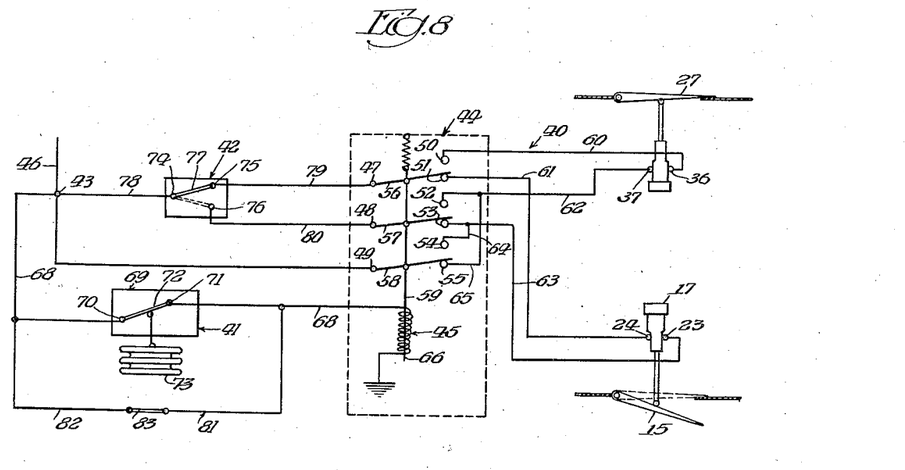
Figure 8 is a diagram showing the electrical circuit system in its other operating position wherein the valve for controlling the branch duct that leads through the engine nacelle to outside air is in its open position.

In addition to the parts heretofore described the apparatus includes control means for automatically actuating or operating the actuators 17 and 30 so that they automatically so control their respective valves that the lubricating oil for the engine is maintained at the proper or desired temperature or precluded from overheating when the airplane is on the ground as well as in flight. This automatic control means includes the actuators 17 and 30 and embodies an electric circuit system 40, a pressure switch 41 and a temperature regulator 42. The circuit system 40 includes the pressure switch 41 and the temperature regulator 42 as parts thereof, is supplied with electric current from a binding post 43, and comprises a 2-position multiple switch 44, and a solenoid 45 for operating the switch 44. The binding post 43 is supplied with current by way of a conductor 46 which leads from a battery, generator, or any other source of direct current. The 2-position multiple switch 44 comprises three binding posts 47, 48 and 49 at one side thereof, six fixed contacts 50, 51, 52, 53, 54 and 55 at the other side thereof, and in addition three movable contacts 56, 57 and 58. The movable contacts are pivotally connected to the binding posts 47, 48 and 49, respectively, and are connected together for conjoint swinging movement by a bar 59. The movable contact 56 is adapted to swing back and forth between contacts 50 and 51; the movable contact 57 is adapted to swing back and forth between contacts 52 and 53; and the movable contact 58 is adapted to swing back and forth between contacts 54 and 55. When the bar 59 is in one position the movable contacts 56, 57 and 58 are in contact with the fixed contacts 50, 52 and 54, respectively, and when the bar 59 is shifted in the opposite direction into its other position the three movable contacts are in contact with the fixed contacts 51, 53, and 55 respectively. As hereinafter pointed out more in detail, shift of the bar 59 is effected by the solenoid 45. The fixed contact 50 is connected to the binding post 36 on the body 31 of the actuator 30 by a conductor 60; the fixed contact 51 is connected to the binding post 24 on the body 18 of the actuator 17 by a conductor 61; the fixed contact 52 is connected to the binding post 37 by a conductor 62; the fixed contact 53 is connected to the binding post 23 by a conductor 63; the fixed contact 54 is connected by a conductor 64 to the conductor 63; and the fixed contact 55 is connected to the conductor 62 by a conductor 65. When current is supplied to the binding posts 47 and 49 while the movable contacts 56 and 58 are in contact with the fixed contacts 50 and 54, respectively, current is supplied to the binding posts 36 and 23 with the result that the actuator 30 shifts the valve 27 into its open position and the actuator 17 shifts the valve 15 into its closed position. When current is supplied to the binding posts 47 and 49 while the movable contacts 56 and 58 are in contact with the fixed contacts 51 and 55, respectively, current is supplied to the binding posts 24 and 37 with the result that the actuator 17 shifts the valve 15 into its open position and the actuator 30 shifts the valve 27 into its closed position. The solenoid 45 for shifting the multiple switch 44 back and forth between its two positions comprises an armature 66 and a coil 67 around the armature. The armature is movably mounted within the coil. It is connected to the shift bar 59 for the movable contacts of the 2-position switch 44, and is adapted when the coil 67 is not energized to hold the movable contacts 56, 57 and 58 in the position shown in Figure 7 wherein such contacts are in contact with the fixed contacts 50, 52 and 54, respectively, and when the coil 67 is energized to shift the movable contacts 56, 57 and 58 into the position shown in Figure 8 wherein they are in contact with the fixed contacts 51, 53 and 55, respectively. One end of the coil 67 of the solenoid 45 is grounded and the other end is connected to the binding post 43 by a conductor 68 which includes the pressure switch 41. Such switch is mounted in the upper portion of the front end of the duct 10 in front of the oil cooler 11, as shown in Figure 4. It is of standard or conventional design and comprises a housing 69, a binding post 70, a fixed contact 71, a movable contact 72, and a bellows type diaphragm 73. The housing 69 of the pressure switch is positioned exteriorly of the duct 10, as shown in Figure 4. It houses the binding post 70, the fixed contact 71 and the movable contact 72. The latter contact is pivotally connected to the binding post 70 so as to swing back and forth between a switch closing position wherein it contacts the fixed contact 71 and an open position wherein it is out of contact with the contact 71. The diaphragm 73 is operatively connected to the movable contact 72 and is interiorly positioned with respect to the front end of the duct 10 so that it is responsive to variations or changes in the pressure of the air flowing into and through the duct. The pressure switch 41 is so arranged and constructed that when the pressure of the air flowing through the duct is comparatively low as a result of the airplane A being operated on the ground directly before or after flight the bellows type diaphragm 73 holds the movable contact 72 in its open position, as shown in Figure 7, and when the pressure of the air in transit through the duct is high due to forward propulsion of the airplane A in connection with flight thereof the diaphragm maintains the movable contact 72 in its closed position, i. e., in bridging or contacting relation with the fixed contact 71. When the pressure switch is open as a result of the airplane being operated on the ground the solenoid 45 is not energized with the result that the movable contacts of the multiple switch 44 assumes the position shown in Figure 7 with the result that the actuator 17 maintains the plate valve 15 closed. When the pressure switch 41 is closed in connection with flight of the airplane A the solenoid 45 is energized and causes the movable contacts of the multiple switch 44 to assume the position shown in Figure 8 wherein the actuator 30 serves to hold the plate valve 27 in its closed position. The temperature regulator 42 forming part of the automatic control means is interposed in the electric circuit system 40 between the binding post 43 and the binding posts 47 and 48 of the 2-position multiple switch 44. It is of standard or conventional design and responds to temperature changes in the oil in circulation through the oil cooler 11. In general the regulator operates when the valve 15 is closed as a result of the switch 44 being positioned as shown in Figure 7 to control the position of the valve 27 in order to regulate the temperature of the oil and when the valve 27 is in its closed position as the result of the multiple switch 44 being positioned as shown in Figure 8 to control the position of the valve 15 in order to regulate the temperature of the lubricating oil for the engine. As shown in the drawings the temperature regulator 42 is mounted on the oil cooler 11 so that it is responsive to variations in the temperature of the oil in circulation through the cooler. It comprises a binding post 74, a pair of fixed contacts 75 and 76 and a movable contact 77. The binding post 74 is connected to the binding post 43 by a conductor 78; the fixed contact 75 is connected to the binding post 47 of the switch 44 by a conductor 79; and the fixed contact 76 is connected to the binding post 48 by a conductor 80. The movable contact 77 is pivotally connected to the binding post 74 to swing back and forth between the fixed contacts 75 and 76. The regulator 42 is so constructed and arranged that when the lubricating oil for the airplane engine $a$ is overheated, i. e., heated above a predetermined or desired temperature, the movable contact 77 is in contact with the fixed contact 75 and when the temperature of the oil is too cool, i. e., lower than a predetermined or desired temperature the movable contact 77 is in contact with the fixed contact 76. When the airplane A is operated on the ground the multiple switch 44 is in the position shown in Figure 7 as heretofore pointed out, with the result that the actuator 17 maintains the valve 15 in its closed position. Should, in connection with ground operation of the airplane A, the engine lubricating oil be too hot as may occur directly after landing or grounding of the airplane, the temperature regulator 42 assumes a position wherein its movable contact 77 is in contact with the fixed contact 75. In such position of the regulator the following circuit is established: binding post 43, conductor 78, binding post 74, movable contact 77, fixed contact 75, conductor 79, binding post 47, movable contact 56, fixed contact 50, conductor 60 and binding post 36. The establishment of such circuit results in the actuator 30 opening the valve 27 to the end that outside air is drawn by the fan $a^6$ through the duct 10 and the branch 13 past the oil cooler 11 and thus results in cooling of the lubricating oil as it flows through the cooler 11. Should, in connection with ground operation of the airplane A, the temperature of the engine lubricating oil drop below normal or the desired temperature the temperature regulator 42 assumes a position wherein its movable contact 77 is in contact with the fixed contact 76. When the switch is in such position the following electrical circuit is established: binding post 43, conductor 78; binding post 74, movable contact 77, fixed contact 76, conductor 80, binding post 48, movable contact 57, fixed contact 52, conductor 62 and binding post 37. The establishment of such circuit results in the actuator 30 closing the valve 27 and thus stopping the flow of outside air through the duct 10. When the valve 27 is in its closed position in connection with ground operation of the airplane A the engine lubricating oil rises in temperature until such time as the regulator 42 assumes the position wherein its movable contact 77 is in contact with the fixed contact 75. At such time the actuator 30 operates to open the valve 27, thus enabling the fan $a^6$ to draw outside air through the duct 10 and the branch 13 for oil cooling purposes. When the airplane A is in flight the pressure switch 41 operates, as hereinbefore described, to close the circuit for the solenoid 45 and the latter maintains the 2-position multiple switch 44 in the position shown in Figure 8 wherein the actuator 30 maintains the valve 27 in its closed position. Should, in connection with flight of the airplane A, the temperature of the engine lubricating oil rise above its normal or predetermined temperature, the temperature regulator 40 assumes a position wherein its movable contact 77 is in contact with the fixed contact 75. When the regulator is in such position the following circuit is established: binding post 43, conductor 78, binding post 74, movable contact 77, fixed contact 75, conductor 79, binding post 47, movable contact 56, fixed contact 51, conductor 61 and binding post 24. The establishment of such circuit results in the actuator 17 opening the valve 15. As soon as the valve is open outside air flows through the duct 10 and the branch 12 past the oil cooler 11 and effects cooling of the engine lubricating oil as it circulates through the cooler. Should, in connection with flight of the airplane A, the temperature of the oil drop below its desired or normal temperature the regulator 42 assumes the position wherein its movable contact 77 is in contact with the fixed contact 76. In such position of the regulator the following circuit is established: binding post 43, conductor 78, binding post 74, movable contact 77, fixed contact 76, conductor 80, binding post 48, movable contact 57, fixed contact 53, conductor 63 and binding post 23. The establishment of such circuit results in the actuator 17 closing the valve 15. Upon closing of the valve 15 flow of outside air through the duct 10 ceases with the result that the engine lubricating oil in circulation through the cooler is not subjected to a cooling action and hence rises in temperature. The engine lubricating oil rises in temperature until such time that it exceeds its desired high range at which time the temperature regulator 40 assumes its normal position wherein its movable contact 77 is in contact with the fixed contact 75. As soon as the regulator assumes such position current, as heretofore pointed out, is supplied to the binding post 24 with the result that the actuator 17 operates to shift the valve 15 into its open position wherein it permits outside air to flow through the duct 10 and the branch 12 past the oil cooler 11.

In order to assure closing of the valve 27 when the airplane A is in flight the automatic control means includes in addition to the electric circuit system 40 a supplemental circuit 81 consisting of a conductor 82 and a normally open switch 83 in the conductor 82. One end of the conductor 82 is connected to the conductor 68 at a point between the pressure switch 41 and the binding post 43. The other end of the conductor 82 is connected to the conductor 68 at a point between the pressure switch 41 and the solenoid 45. The normally open switch 83 in the conductor 82 is positioned within the inner portion of one of the outboard sections of the wing $a^2$ of the airplane A and is arranged so that it is closed when the strut $a^{12}$ that is associated with the inner portion of said one outboard wing section is swung upwards into its retracted position. After take-off of the airplane A and retraction of the landing gear the switch 83 is closed and hence results in the solenoid 45 being energized and causing the 2-position multiple switch 44 to be shifted into the position shown in Figure 8 wherein the movable contact 58 is in contact with the fixed contact 55 and current is supplied to the actuator 30 via the conductor 62, thus resulting in the actuator 30 closing the valve 27. When the landing gear for the airplane A is shifted into its operative or ground engaging position the switch 83 opens, thus breaking the electrical circuit through the conductor 82. When the solenoid 45 is energized as a result of closing of either the pressure switch 41 or the normally open switch 83 closing of the valve 27 is effected and the valve 15 is subject to control in response to operation of the temperature regulator 42, as hereinbefore described. The normally open switch 83 may be used either in conjunction with, or independent of, the pressure switch 41. In other words, it is contemplated, as far as the present oil temperature controlling apparatus is concerned, that the means for automatically actuating or operating the actuators 17 and 13 may include either the pressure switch 41 or the normally open switch 83, or both.

The herein described oil temperature controlling apparatus effectively and efficiently fulfills its intended purpose and is characterized by the fact that it is automatically actuated and serves to maintain the engine lubricating oil at the proper or desired temperature regardless of whether the airplane with which the apparatus is associated is in flight or in operation on the ground. The apparatus is also characterized by the fact that it is comparatively light in weight and may be produced at a low and reasonable cost.

The invention is not to be understood as restricted to the details set forth since these may be modified within the scope of the appended claims without departing from the spirit and scope of the invention.

Having thus described the invention what I claim as new and desire to secure by Letters Patent is:

1. In combination with a pusher type airplane having a nacelle enclosed propeller driving engine and fan means for producing an air stream through the nacelle and around the engine for engine cooling purposes, an apparatus adapted to control the temperature of the lubricating oil for the engine and comprising a duct extending substantially lengthwise of the airplane and having its front end open to receive outside air and its rear end shaped to form a pair of branches, one of which is arranged to exhaust directly into outside air and the other of which leads to, and discharges into, the air stream for cooling the engine, an oil cooler for the engine disposed in the duct in front of the two branches, and a pair of valves associated, respectively, with, and adapted to control the flow of air through, said branches.

2. In combination with a pusher type airplane having a nacelle enclosed propeller driving engine and an engine driven fan in the nacelle for producing an air stream through the nacelle and around the engine for engine cooling purposes, an apparatus adapted to control the temperature of the lubricating oil for the engine and comprising a duct disposed within the front portion of, and extending substantially lengthwise with respect to, the nacelle, and having its front end leading through the front portion of the nacelle so as to receive outside air and the rear end thereof shaped to form a pair of branches, one of which leads through the engine nacelle so as to exhaust directly into outside air and the other of which leads to and discharges into the air stream for cooling the engine, an oil cooler for the engine disposed in the duct in front of the two branches, and a pair of valves associated, respectively, with, and adapted to control the flow of air through, said branches.

3. In combination with a pusher type airplane having a longitudinally elongated nacelle, a propeller driving engine in the rear portion of the nacelle, a longitudinal conduit disposed in the front portion of the nacelle and having its front end open to receive outside air and its rear end terminating adjacent the engine, and an engine driven suction fan positioned adjacent the rear end of the conduit and adapted during operation of the engine to draw air through the conduit and direct it around the engine for engine cooling purposes, and apparatus adapted to control the temperature of the engine lubricant and comprising a duct extending substantially lengthwise of the airplane and having its front end open to receive outside air and its rear end shaped to form a pair of branches, one of which is arranged to exhaust directly into outside air and the other of which leads through, and is in communication with the interior of, the rear end of the conduit, a lubricant cooler for the engine disposed in the duct in front of the two branches, and a pair of valves associated, respectively, with, and adapted to control the flow of air through, said two branches.

4. In combination with a pusher type airplane having a longitudinally elongated nacelle, a propeller driving engine in the rear portion of the nacelle, a longitudinal conduit disposed in the front portion of the nacelle and having its front end open to receive outside air and its rear end terminating adjacent the engine, and an engine driven suction fan positioned adjacent the rear end of the conduit and adapted during operation of the engine to draw air through the conduit and direct it around the engine for engine cooling purposes, an apparatus adapted to control the temperature of the engine lubricant and comprising a duct at one side of the conduit, disposed within the front portion of, and extending substantially lengthwise with respect to, the nacelle, and having its front end leading through the front portion of the nacelle to receive outside air and the rear end thereof shaped to form a pair of branches, one of which leads through the nacelle so as to exhaust into outside air and the other of which leads through, and is in communication with the interior of, the rear end of the conduit, a lubricant cooler for the engine disposed in the duct in front of the two branches, and a pair of valves associated, respectively, with, and adapted to control the flow of air through said branches.

5. In combination with a pusher type airplane having a nacelle enclosed propeller driving engine and fan means for producing an air stream through the nacelle and around the engine for engine cooling purposes, an apparatus adapted to control the temperature of the lubricating oil for the engine and comprising a duct extending substantially lengthwise of the airplane and having its front end open to receive outside air and its rear end shaped to form a pair of branches, one of which is arranged to exhaust into outside air and the other of which leads to, and discharges into, the air stream for cooling the engine, an oil cooler for the engine disposed in the duct in front of the two branches, a pair of valves associated, respectively, with, and adapted to control the flow of air through, said branches, and an electrical valve controlling system including a pressure switch and operative automatically to close the valve for controlling said one branch when the airplane is operated on the ground and to close the valve for controlling said other branch when the airplane is in flight.

6. In combination with a pusher type airplane having a longitudinally elongated nacelle, a propeller driving engine in the rear portion of the nacelle, a longitudinal conduit disposed in the front portion of the nacelle and having its front end open to receive outside air and its rear end terminating adjacent the engine, and an engine driven suction fan positioned adjacent the rear end of the conduit and adapted during operation of the engine to draw air through the conduit and direct it around the engine for engine cooling purposes, an apparatus adapted to control the temperature of the lubricating oil for the engine and comprising a duct extending substantially lengthwise of the airplane and having its front open to receive outside air and the rear end thereof provided with a discharge part leading through, and communicating with the interior of, the rear end of the conduit, an oil cooler for the engine disposed in the duct in front of the discharge part, a valve associated with, and adapted to control the flow of air through, said discharge part, and an electric valve controlling system including a pressure switch and operative automatically to close the valve when the airplane is in flight.

7. In combination with a pusher type airplane having a longitudinally elongated nacelle, a propeller driving engine in the rear portion of the nacelle, a longitudinal conduit disposed in the front portion of the nacelle and having its front end open to receive outside air and its rear end terminating adjacent the engine, and an engine driven suction fan positioned adjacent the rear end of the conduit and adapted during operation of the engine to draw air through the conduit and direct it around the engine for engine cooling purposes, an apparatus adapted to control the temperature of the engine lubricant and comprising a duct at one side of the conduit, disposed within the front portion of, and extending substantially lengthwise with respect to, the nacelle, and having its front end leading through the front portion of the nacelle to receive outside air and the rear end thereof shaped to form a pair of branches, one of which leads through the nacelle so as to exhaust into outside air and the other of which leads through, and is in communication with the interior of, the rear end of the conduit, a lubricant cooler for the engine disposed in the duct in front of the branches, a pair of valves associated, respectively, with, and adapted to control the flow of air through, said branches, and an electrical valve controlling system including a pressure switch and operative automatically to close the valve for the one branch when the airplane is operating on the ground and to close the valve for the other branch when the airplane is in flight.

8. In combination with an airplane having a nacelle enclosed propeller driving engine and fan means for producing an air stream through the nacelle and around the engine for engine cooling purposes, an apparatus adapted to control the temperature of the lubricating oil for the engine and comprising a duct extending substantially lengthwise of the airplane and having its front end open to receive outside air and its rear end shaped to form a pair of branches, one of which is arranged to exhaust into outside air and the other of which leads to, and discharges into, the air stream for cooling the engine, an oil cooler for the engine disposed in the duct in front of the two branches, a pair of valves associated, respectively, with, and adapted to control the flow of air through, said branches, and an electrical valve controlling system including a pressure switch operative automatically to effect closing of the valve for the one branch when the airplane is in operation on the ground and to effect closing of the valve for the other branch when the airplane is in flight, and also including an electric regulator responsive to changes in temperature of the engine lubricating oil and operative automatically to effect control of the second mentioned valve when the first mentioned valve is closed and to effect control of the first mentioned valve when the second mentioned valve is closed.

9. In combination with a pusher type airplane having a nacelle enclosed propeller driving engine and an engine driven fan in the nacelle for producing an air stream through the nacelle and around the engine for engine cooling purposes, an apparatus adapted to control the temperature of the lubricating oil for the engine and comprising a duct disposed within the front portion of, and extending substantially lengthwise with respect to, the nacelle, and having its front end leading through the front portion of the nacelle so as to receive outside air and the rear end thereof shaped to form a pair of branches, one of which leads through the engine nacelle so as to exhaust into outside air and the other of which leads to, and discharges into, the air stream for cooling the engine, an oil cooler for the engine disposed in the duct in front of the two branches, a pair of valves associated, respectively, with, and adapted to control the flow of air through, said branches, and an electrical valve controlling system including a pressure switch operative automatically to close the valve for the one branch when the airplane is in operation on the ground and to close the valve for the other branch when the airplane is in flight, and also including an electric regulator responsive to changes in temperature of the engine lubricating oil in circulation through the cooler and operative automatically to control the second mentioned valve when the first mentioned valve is closed and for automatically controlling the first mentioned valve when the second mentioned valve is closed.

10. In combination with a pusher type airplane having a retractable landing gear, a nacelle enclosed propeller driving engine and fan means for producing an air stream through the nacelle and around the engine for engine cooling purposes, an apparatus adapted to control the temperature of the lubricant for the engine, comprising a duct extending substantially lengthwise of the airplane and having its front end open to receive outside air and its rear end shaped to form a pair of branches, one of which is arranged to exhaust into outside air and the other of which leads to, and discharges into, the air stream for cooling the engine, a lubricant cooler for the engine disposed in the duct in front of the two branches, a pair of valves associated, respectively, with, and adapted to control the flow of air through, said branches, and an electrical valve controlling system including means operative automatically in response to retraction of the landing gear to close the valve for said other branch and in addition including means operative automatically in response to changes in temperature of the lubricant to control the valve for the one branch when the valve for said other branch is in its closed position in response to operation of the first mentioned means.

11. In combination with a pusher type airplane having a retractable landing gear, a nacelle enclosed propeller driving engine and fan means for producing an air stream through the nacelle and around the engine for engine cooling purposes, an apparatus adapted to control the temperature of the lubricant for the engine, comprising a duct extending substantially lengthwise of the airplane and having its front end open to receive outside air and its rear end shaped to form a pair of branches, one of which is arranged to exhaust into outside air and the other of which leads to, and discharges into, the air stream for cooling the engine, a lubricant cooler for the engine disposed in the duct in front of the two branches, a pair of valves associated, respectively, with, and adapted to control the flow of air through, said branches, and electrical means for automatically closing the valve for said one branch when the landing gear is in its operative position and automatically closing the valve for said other branch when the landing gear is in its retracted position.

DALTON B. SUGGS.

REFERENCES CITED

The following references are of record in the file of this patent:

UNITED STATES PATENTS

| Number | Name | Date |
|---|---|---|
| 1,386,493 | Guyot | Aug. 2, 1921 |
| 1,712,622 | Kruckenbert et al. | May 14, 1929 |
| 2,340,396 | McDonnell | Feb. 1, 1944 |
| 2,356,452 | Fedden et al. | Aug. 22, 1944 |
| 2,368,501 | Thompson | Jan. 30, 1945 |